(12) United States Patent
Svedberg (10) Patent No.: US 11,456,959 B2
(45) Date of Patent: Sep. 27, 2022

(54) SAMPLING NODE AND A METHOD PERFORMED THEREBY FOR HANDLING FLOWS THROUGH A SDN BETWEEN CLIENT(S) AND ORIGIN SERVER(S) OF A COMMUNICATION NETWORK

(71) Applicant: TELEFONAKTIEBOLAGET LM ERICSSON (PUBL), Stockholm (SE)

(72) Inventor: Johan Svedberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1228 days.

(21) Appl. No.: 15/551,990

(22) PCT Filed: Feb. 26, 2015

(86) PCT No.: PCT/SE2015/050217
§ 371 (c)(1),
(2) Date: Aug. 18, 2017

(87) PCT Pub. No.: WO2016/137371
PCT Pub. Date: Sep. 1, 2016

(65) Prior Publication Data
US 2018/0048579 A1 Feb. 15, 2018

(51) Int. Cl.
*H04L 12/851* (2013.01)
*H04L 12/26* (2006.01)
(Continued)

(52) U.S. Cl.
CPC ........ *H04L 47/2483* (2013.01); *H04L 43/022* (2013.01); *H04L 43/026* (2013.01); *H04L 43/0888* (2013.01); *Y02D 30/50* (2020.08)

(58) Field of Classification Search
CPC .............. H04L 47/2483; H04L 43/022; H04L 43/0888; H04L 43/026; Y02D 30/50
See application file for complete search history.

(56) References Cited

U.S. PATENT DOCUMENTS

2013/0329734 A1* 12/2013 Chesla ................ H04L 63/1416
370/392
2014/0153435 A1* 6/2014 Rolette ................. H04L 43/062
370/252
(Continued)

OTHER PUBLICATIONS

International Search Report and Written Opinion issued in Application No. PCT/SE2015/050217 dated Dec. 4, 2015, 7 pages.

*Primary Examiner* — Charles C Jiang
*Assistant Examiner* — Voster Preval
(74) *Attorney, Agent, or Firm* — Rothwell, Figg, Ernst & Manbeck, P.C.

(57) ABSTRACT

A sampling node in a SDN and a method performed thereby for handling flows through the SDN between client(s) and origin server(s) of a communication network connected to the SDN are provided. The method comprising receiving (110) a fraction of a total amount of traffic flows originating at client(s) served by the SDN, and destined for the origin server(s); identifying (120) which of the received traffic flows that benefit from being routed via a service optimising node, capable of providing value added services, VAS, to the traffic flows, by fulfilling predetermined conditions; and determining (130), for each individual traffic flow, a capacity demand of the flow. The method further comprises selecting (150) which traffic flows that shall be routed via the service optimising node on the basis of their capacity demand considering a capacity of the service optimising node; and informing (160) a flow switch of the SDN about which traffic flows should bypass the service optimising node and which traffic flows that should be routed via the service optimising node.

20 Claims, 6 Drawing Sheets

(51) Int. Cl.
*H04L 47/2483* (2022.01)
*H04L 43/022* (2022.01)
*H04L 43/026* (2022.01)
*H04L 43/0888* (2022.01)

(56) References Cited

U.S. PATENT DOCUMENTS

| | | | |
|---|---|---|---|
| 2014/0254406 A1* | 9/2014 | Anumala | H04L 47/10 370/252 |
| 2015/0222554 A1* | 8/2015 | Xu | H04L 47/2483 370/353 |
| 2016/0112337 A1* | 4/2016 | Zhang | H04L 69/22 370/237 |
| 2016/0205015 A1* | 7/2016 | Halligan | H04L 45/56 370/400 |
| 2016/0254959 A1* | 9/2016 | Arndt | H04L 65/80 370/235 |
| 2017/0006092 A1* | 1/2017 | Rochwerger | H04L 67/1001 |
| 2017/0063734 A1* | 3/2017 | Kumar | H04L 49/9005 |
| 2017/0149665 A1* | 5/2017 | Yousaf | H04L 47/32 |
| 2017/0150393 A1* | 5/2017 | Payer | H04W 72/1242 |
| 2018/0270159 A1* | 9/2018 | Song | H04L 43/0882 |

* cited by examiner

SAMPLING NODE AND A METHOD PERFORMED THEREBY FOR HANDLING FLOWS THROUGH A SDN BETWEEN CLIENT(S) AND ORIGIN SERVER(S) OF A COMMUNICATION NETWORK

CROSS REFERENCE TO RELATED APPLICATION(S)

This application is a 35 U.S.C. § 371 National Stage of International Patent Application No. PCT/SE2015/050217, filed Feb. 26, 2015, designating the United States, which is incorporated by reference.

TECHNICAL FIELD

The present disclosure relates to communication networks and in particular to a sampling node in a Software Defined Network, SDN, for handling flows through the SDN between client(s) and origin server(s) of a communication network.

BACKGROUND

SDN enables operators to set up flows for different purposes, e.g. setting up flows to pass Network Functions Virtualisations NFVs or proxies performing value added services, such as caching, transcoding and virus scanning, in this disclosure referred to as optimisation. A certain set of these value added services only makes sense to use for certain destination sites, e.g. there is no reason to have a video transcoding proxy in the chain for sites that does not contain video. Which sites that contains what can be learned e.g. with DPI technology and this insight can then be used to set up the SDN in the correct way.

The capacity demand on nodes providing value added services or NFVs may vary over time and a node providing these services should not be overflowed. However, designing the node to be able to handle dynamically and fast changing traffic patterns is costly

SUMMARY

The object is to obviate at least some of the problems outlined above. In particular, it is an object to provide a sampling node and a method performed by the sampling node in a SDN for handling flows through the SDN between client(s) and origin server(s) of a communication network connected to the SDN. These objects and others may be obtained by providing a sampling node and a method performed by a sampling node according to the independent claims attached below.

According to an aspect a method performed by a sampling node in a SDN for handling flows through the SDN between client(s) and origin server(s) of a communication network connected to the SDN is provided. The method comprises receiving a fraction of a total amount of traffic flows originating at client(s) served by the SDN, and destined for the origin server(s); identifying which of the received traffic flows that benefit from being routed via a service optimising node, capable of providing value added services, VAS, to the traffic flows, by fulfilling predetermined conditions; and determining, for each individual traffic flow, a capacity demand of the flow. The method further comprises selecting which traffic flows that shall be routed via the service optimising node on the basis of their capacity demand considering a capacity of the service optimising node; and informing a flow switch of the SDN about which traffic flows should bypass the service optimising node and which traffic flows that should be routed via the service optimising node.

According to an aspect a sampling node in a SDN for handling flows through the SDN between client(s) and origin server(s) of a communication network connected to the SDN is provided. The sampling node is configured for receiving a fraction of a total amount of traffic flows originating at client(s) served by the SDN, and destined for the origin server(s); identifying which of the received traffic flows that benefit from being routed via a service optimising node, capable of providing value added services, VAS, to the traffic flows, by fulfilling predetermined conditions; and determining, for each individual traffic flow, a capacity demand of the flow. The sampling node further is configured for selecting which traffic flows that shall be routed via the service optimising node on the basis of their capacity demand considering a capacity of the service optimising node; and informing a flow switch of the SDN about which traffic flows should bypass the service optimising node and which traffic flows that should be routed via the service optimising node.

The sampling node and the method performed by the sampling node may have several possible advantages. One possible advantage is that possible overload situations in the service optimising node may be avoided. Another possible advantage is that the usage of capacity of the service optimising node may be maximised such that no or little capacity is left unused. Another possible advantage is that little, or no, supervision or monitoring may be required in order to detect a possible overflow situation. Still a possible advantage is that the dimensioning and performance management processes may be simplified.

BRIEF DESCRIPTION OF DRAWINGS

Embodiments will now be described in more detail in relation to the accompanying drawings, in which:

FIG. 1b is a flowchart of a method performed by a sampling node in a SDN for handling flows through the SDN between client(s) and origin server(s) of a communication network, according to yet an exemplifying embodiment in addition to the exemplifying embodiment of FIG. 1a.

DETAILED DESCRIPTION

Briefly described, a sampling node in a SDN and a method performed thereby for handling flows through the SDN between client(s) and origin server(s) of a communication network connected to the SDN are provided. The sampling node receives a fraction of a total amount of traffic flows and based on the capacity demand of individual traffic flows with regard to the fraction, the sampling node determines a total capacity demand for the total amount of traffic flows. The sampling node further considers both the total capacity demand for an individual traffic flow and a capacity available of an optimising node when determining if the traffic flow should be routed by the service optimising node.

Embodiments of a method performed by a sampling node in a Software Defined Network, SDN, for handling flows through the SDN between client(s) and origin server(s) of a communication network connected to the SDN will now be described with reference to FIGS. 1a-1b.

Figure 1A:
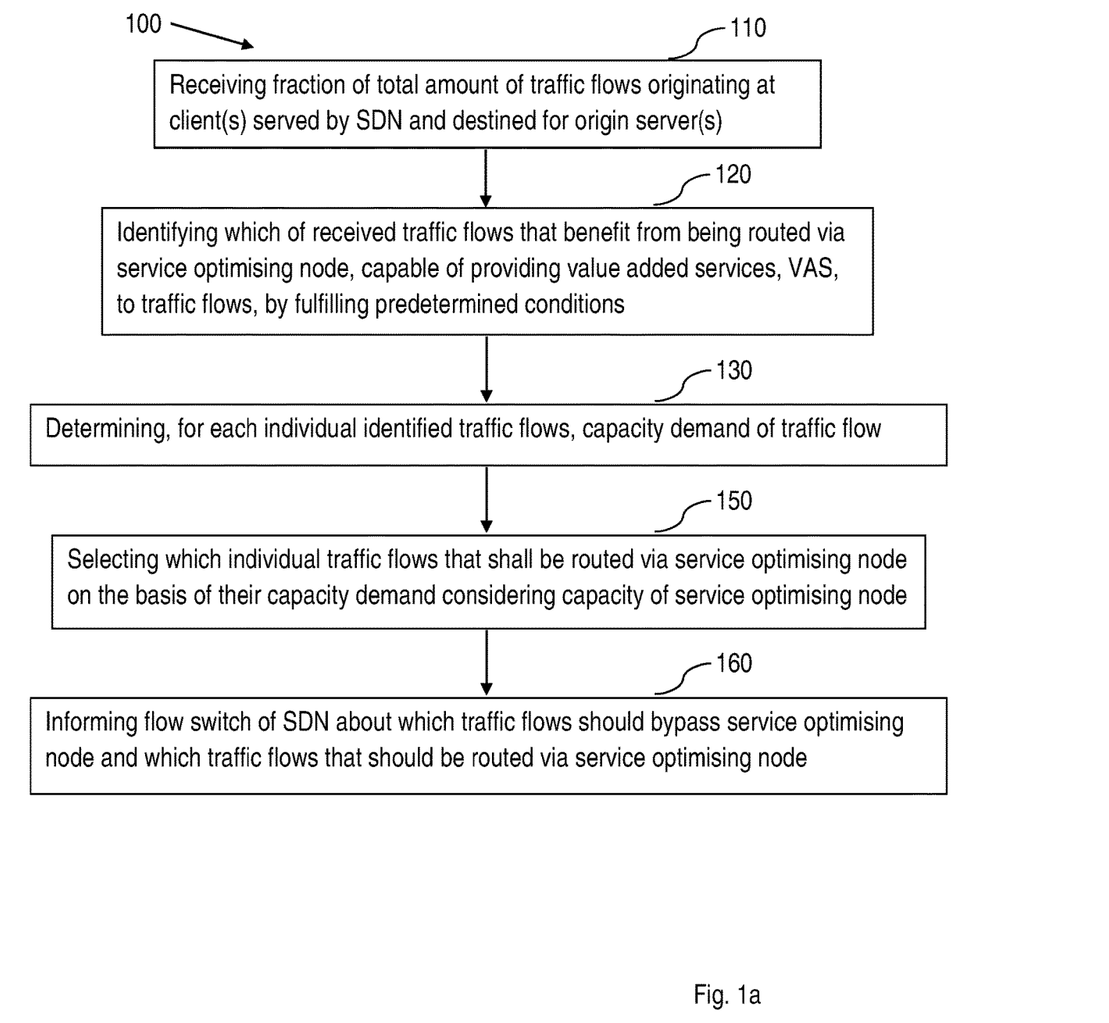
FIG. 1a is a flowchart of a method performed by a sampling node in a SDN for handling flows through the SDN between client(s) and origin server(s) of a communication network, according to an exemplifying embodiment.

FIG. 1a illustrates the method 100 comprising receiving 110 a fraction of a total amount of traffic flows originating at client(s) served by the SDN, and destined for the origin server(s); identifying 120 which of the received traffic flows that benefit from being routed via a service optimising node, capable of providing value added services, VAS, to the traffic flows, by fulfilling predetermined conditions; and determining 130, for each individual traffic flow, a capacity demand of the flow. The method further comprises selecting 150 which traffic flows that shall be routed via the service optimising node on the basis of their capacity demand considering a capacity of the service optimising node; and informing 160 a flow switch of the SDN about which traffic flows should bypass the service optimising node and which traffic flows that should be routed via the service optimising node.

There is generally a plurality of clients sending requests for different services provided by origin servers, the requests generating corresponding traffic flows. The requests may be requests for different services and they may be destined for a plurality of different servers, likewise the traffic flows are associated with different servers and/or services. In order to determine which services that can be optimised, e.g. contains content that be cached and have a long response time or high resolution vide that would benefit from transcoding, the sampling node receives the fraction of a total amount of traffic flows originating at client(s) served by the SDN, and destined for the origin server(s). The size of the fraction is known by the sampling node. The fraction also comprises a plurality of traffic flows.

The sampling node further identifies which of the received traffic flows that benefit from being routed via the service optimising node, capable of providing value VAS to the traffic flows, by fulfilling predetermined conditions. Not all services may benefit from being routed via the service optimising node. By being able to benefit from being routed via the service optimising node could mean that the end user would get a better experience if the content is be served by a cache in the optimizing node with low latency instead of being served by the original server with high latency, How to identify which of the received traffic flows that benefit from being routed via the service optimising node is commonly known and out of the scope of this disclosure.

A VAS may comprise options that complement a core service offered from a company but are not as vital, necessary or important. Value added services may be introduced to customers after they have purchased the core services around which these ancillary offerings may be built. In some instances, a VAS is something extra that is provided to a customer at no additional charge. At other times, the ancillary service is offered to an existing customer for an extra fee. There may be different VASs that may be used to enhance or compliment different services and there may also be services for which no VAS is applicable or suitable. Hence the sampling node identifies which of the received traffic flows that benefit from being routed via the service optimising node, capable of providing value VAS to the traffic flows.

Different traffic flows may give rise to different capacity demands. Some traffic flows may generate a relatively high capacity demand while other traffic flows may generate a relatively low capacity demand. Thus, the sampling node determines, for each individual traffic flow, a respective capacity demand of the traffic flow.

The service optimising node generally does not have unlimited resources, meaning that it does not have the capacity to provide VASs to all traffic flows in the total amount of traffic flows. Thus, the sampling node selects which traffic flows that shall be routed via the service optimising node on the basis of their capacity demand considering the capacity of the service optimising node. In other words, the sampling node may compare, traffic flow by traffic flow, the respective capacity demand of the traffic flow within the total amount of traffic flows and compare it to the capacity of the service optimising node. If the service optimising node has capacity left to accommodate the capacity demand of e.g. traffic flow A within the total amount of traffic flows, then the network node may select all traffic flow A within the total amount of traffic flows be routed via the service optimising node.

The sampling node then informs the flow switch of the SDN about which traffic flows should bypass the service optimising node, i.e. which traffic flows that should not be optimised, and which traffic flows that should be routed via the service optimising node. In this manner, all traffic flows within the total amount of traffic flows that are selected to be routed via the service optimising node by means of the flow switch, whereas all other traffic flows within the total amount of traffic flows are routed such that they bypass the service optimising node.

The method performed by the sampling node may have several advantages. One possible advantage is that possible overload situations in the service optimising node may be avoided. Another possible advantage is that the usage of capacity of the service optimising node may be maximised such that no or little capacity is left unused. Another possible advantage is that little, or no, supervision or monitoring may be required in order to detect a possible overflow situation. Still a possible advantage is that the dimensioning and performance management processes may be simplified.

In an example, determining 130 the capacity demand of individual flows comprises determining a respective total capacity demand of the identified individual traffic flows with respect to the total amount of traffic flows from client(s) destined for the origin server(s) based on the capacity demand of the flows within the received fraction and on the assumption that the distribution of individual traffic flows is the same within the total amount of traffic flows as within the received fraction of the total amount of traffic flows.

By knowing the size of the fraction of the total amount of traffic flows, the size of the total amount of traffic flows may be determined. Merely as an example, if the size of the fraction is 1% and a capacity demand for traffic flow A within the fraction is 2 units, then the demand for traffic flow A within the total amount of traffic flows is 100*2 units which is 200 units. The capacity demand may be defined or measured in various different ways, hence in this example the term "units" are used for illustrative purposes.

It shall be pointed out again that it is assumed that the distribution of individual traffic flows is the same within the total amount of traffic flows as within the received fraction of the total amount of traffic flows. A very simplified example is that if the fraction, being 0.5%, comprises traffic flows A, B, and C, then the total amount of traffic flows comprises flows A, B, and C. Further in this illustrative and very simplified example, if traffic flow A generates a capacity demand within the fraction of 3 units, traffic flow B generates a capacity demand within the fraction of 8 units and traffic flow C generates a capacity demand within the fraction of 1 unit; then the traffic flow A generates 200*3=600 units within the total amount of traffic flows, traffic flow B generates 200*8=1600 units and traffic flow C generates 200*1=200 units within the total amount of traffic flows.

Following this illustrative and simplified example, assume that the capacity of the service optimising node is 900 units, then the sampling node may select traffic flows A and C to be routed via the service optimising node since they together generate only 800 units and will thus not cause overflow of the service optimising node. However, traffic flow B may be routed to bypass the service optimising node since the service optimising node does not have the capacity to accommodate traffic flow B. In this example, a capacity of 900−800=100 units is though left un-used in the service optimising node.

The capacity demand may be defined in different ways. In an example, the capacity demand of a flow is defined as an amount of data associated with the traffic flow.

In this example, a capacity demand is defined as the total amount of data that needs to be transmitted in order to complete the service. Merely as an example, a first traffic flow may require that 4 GB to be transmitted, a second traffic flow may require 1 kB to be transmitted, and a third traffic flow may require 2 TB to be transmitted.

In another example, the capacity demand of a flow is defined as an instantaneous data bit rate.

In this example, the traffic flow may be associated with a service that is more time critical or delay sensitive, e.g. 5 Mbit/s, 1 kbit/s, or 10 Gbit/s. The examples here of bit rates are merely examples and are just illustrative of the definition of bit rate.

In an example, a traffic flow is identified based on destination IP-address, protocol and/or destination port.

The clients are provided with different services from different origin servers. The different origin servers may be located in various geographical locations and may all have individual IP addresses. The clients may further communicate with the origin servers by means of different protocols and also a traffic flow associated with a service may be associated with a destination port of an origin server.

Figure 1B:
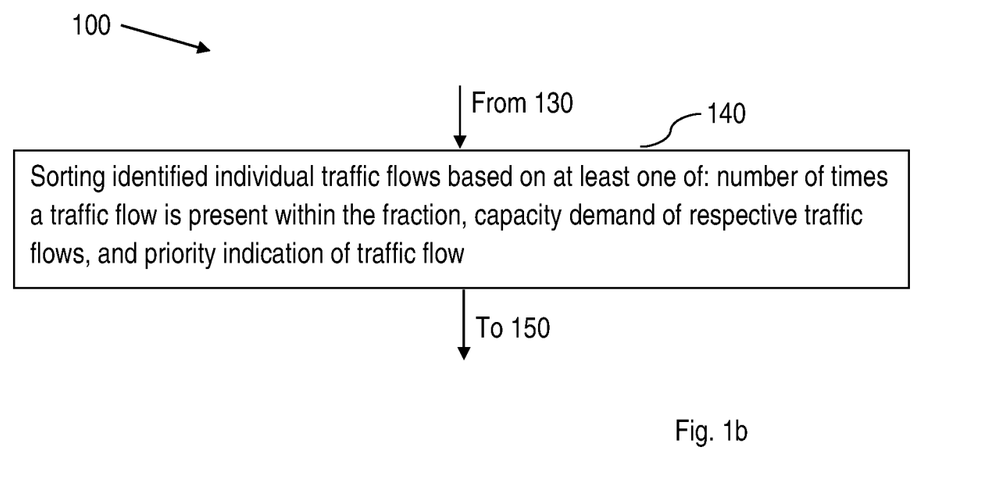

The method may further comprise, as illustrated in FIG. 1b, sorting 140 the identified individual traffic flows based on at least one of: the number of times a traffic flow is present within the fraction, the capacity demand of the respective traffic flows, and a priority indication of a traffic flow, wherein selecting 150 which individual traffic flows that shall be routed via the service optimising node further is based on the sorting of the identified individual traffic flows.

The previous examples suggests selection without any sorting, but alternatively different ways of sorting may be applied, e.g. according to any of the given examples. Once the traffic flows that benefit from being routed via the service optimising node are identified, the sampling node may sort the individual traffic flows according to different criteria as exemplified just above. It may e.g. be more beneficial to route a traffic flow that appears frequently via the service optimising node than traffic flows that appear seldom, granted that the service optimising node has available capacity to accommodate the total capacity demand within the total amount of traffic flows for the traffic flow that appears frequently.

Different traffic flows may be associated with individual priority indications, wherein the sampling node may start by selecting traffic flows with high priority to be routed via the service optimising node, again granted that the service optimising node has available capacity to accommodate the total capacity demand within the total amount of traffic flows for individual traffic flow associated with high priority.

Yet another example is that the sampling node may sort the identified individual traffic flows based on delay sensitivity, Quality of Service and other criteria indicating to the sampling node which traffic flows should be prioritised over others.

In an example, selecting 150 which individual traffic flows that shall be routed via the service optimising node comprises: after selecting a first traffic flow that shall be routed via the service optimising node, the method comprises determining a remaining capacity of the service optimising node if the first traffic flow does not consume the total capacity of the service optimising node, selecting a further traffic flow to be routed via the service optimising node if the capacity demand of the further traffic flow does not exceed the remaining capacity of the service optimising node, and repeating until there is no remaining capacity of the service optimising node.

Once the sampling node has identified the traffic flows that benefit from being routed via the service optimising node, the sampling node shall select which individual traffic flows that shall be routed via the service optimising node. As illustrated in the simplified examples above, the sampling node may determine a first traffic flow A having generating a capacity demand with regard to the total amount of traffic of 5 units, traffic flow B: 10 units, traffic flow C 3 units, traffic flow D 14 units, generating a total capacity demand for all traffic flows to be 32 units. Assume the service optimising node has a capacity of 31 units. In this simplified example, the sampling node starts with the traffic flow having the highest capacity demand, i.e. traffic flow D with 14 units. Since 14<31, the sampling node selects traffic flow D to be routed via the service optimising node. The service optimising node still has 31−14=17 units of capacity left. The sampling node then selects traffic flow B having a capacity demand of 10 units. Since 10<17, the sampling node selects traffic flow B to be routed via the service optimising node. The service optimising node still has 17−10=7 units of capacity left. The sampling node then selects traffic flow A having a capacity demand of 5 units. Since 5<7, the sampling node selects traffic flow A to be routed via the service optimising node. The service optimising node still has 7−5=2 units of capacity left. Since the capacity demand of traffic flow C is 3, the sampling node cannot select traffic flow C since the service optimising node only has 2 units of capacity left. Thus, in this very simplified example, traffic flows A, B and D are selected to be routed via the service optimising node, whereas traffic flow C must be bypassed the service optimising node.

Figure 2:
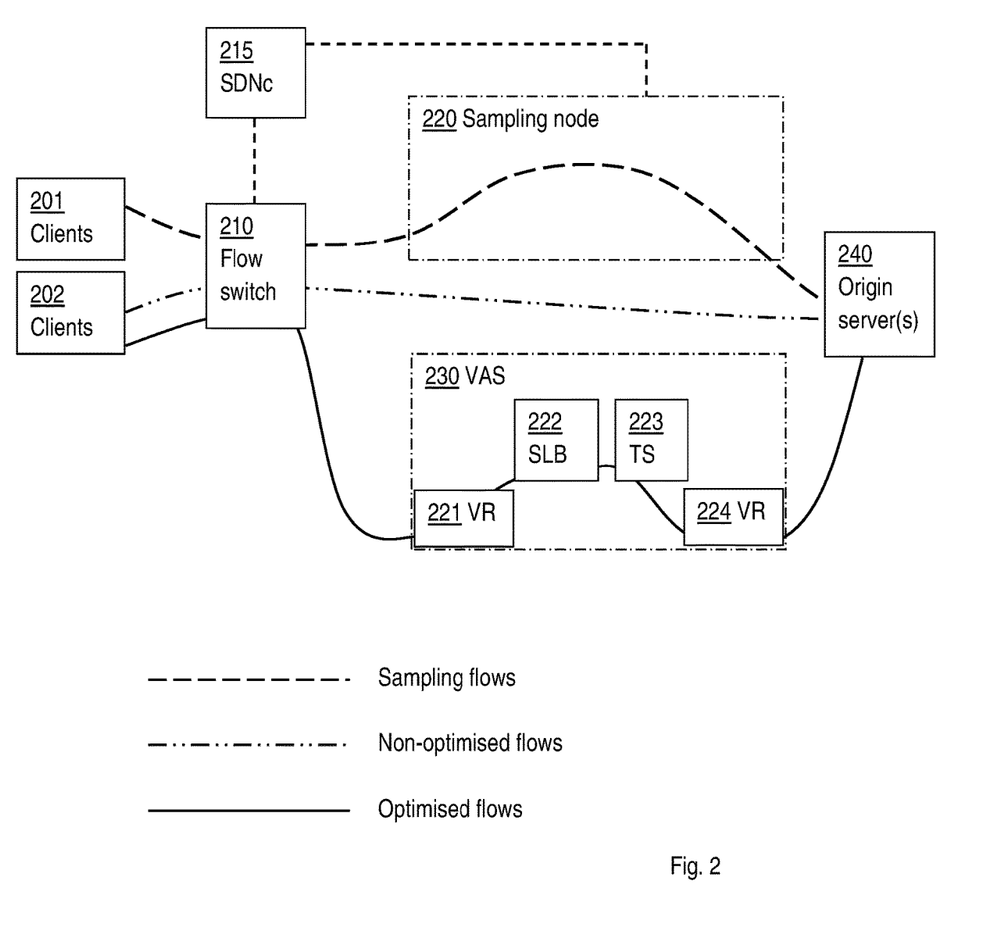
FIG. 2 is a schematic illustration of a communication network comprising clients, sampling node, Value Added Service, VAS, node(s) and origin server(s).

FIG. 2 is a schematic illustration of a communication network comprising clients, a sampling node, service optimising node(s) and origin server(s), here represented with only one origin server. FIG. 2 illustrates a plurality of clients 201-202 having traffic flows between themselves and origin servers 240. FIG. 2 illustrates a fraction of a total amount of traffic flows (top one in the figure) being routed via a flow switch 210 to the sampling node 220. It shall be pointed out that the figure is schematic and it is not that case that one bulk of specific clients (201) are selected to be the fraction out of a total amount of clients (201+202). Instead, out of the total amount of traffic flows, a fraction of these are routed via the sampling node. The sampling node 220 performs the method as described above and informs the flow switch 210 which flows should be routed via the service optimising node 230 (bottom flow of the figure) and which flows should bypass the service optimising node and be routed towards the origin servers 240 directly (middle flow of the figure). It shall be pointed out that it is assumed that the traffic flows and the distribution thereof within the fraction correspond to the total amount of traffic flows, or in other words that the fraction is a statistical representation of the total amount of traffic flows.

Figure 3:
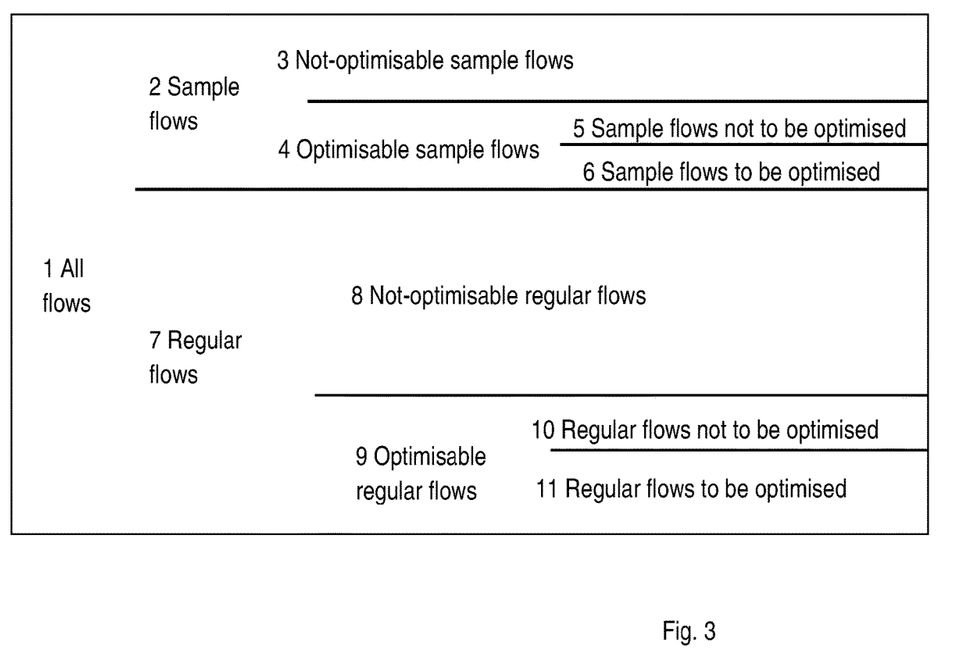
FIG. 3 is an illustration of relationship between different traffic flows.

FIG. 3 is an illustration of relationships between different traffic flows. In FIG. 3, sample flows (2) are a fraction F (for example 0.1%) of total amount of all traffic flows (1), wherein the remaining traffic flows are denoted regular flows (7). Within the fraction of sample flows (2), some sample flows (4) are optimisable, i.e. they would benefit from being routed via a service optimising node, whereas some sample flows (3) are not optimisable, i.e. they would not benefit from being routed via a service optimising node. The non-optimisable sample flows (3) are bypassed the service optimising node. Out of the optimisable sample flows (4), the sampling node informs the SDN flow switch which part of the optimisable sample flows (4), here denoted sample flows to be optimised (6), that should be routed via the service optimising node and which part, i.e. the remaining traffic flows of the optimisable sample flows (4), that possibly could be optimised but should still be bypassed the service optimising node; which are denoted sample flows not to be optimised (5). The distribution of traffic flows within the fraction, i.e. the sample flows (2), is the same at the distribution of traffic flows in all flows (1) and hence also in the remaining, regular flows (7).

Consequently, the relationship between selected flows in terms of throughput is the following:
The sample flows (2) relate to the sample flows to be optimised (6) as the regular flows (7) relates to the regular flows to be optimised (11).
The sample flows (2) relate to the regular flows (7) so that (2)/F=(7).
The max throughput of the regular flows to be optimised (11) is denoted C (for example 50 Gbit/s).
The throughput of the sample flows (2) are denoted M.
The throughput of the sample flows to be optimised (6) are denoted R.
Meaning that: R/M=C/(M/F)=> If the sampler has delivered total 1 TB then it should not report flows that have delivered more than X bytes, where X is selected so than X/1 TB (R/M) is less than or equal to C×F/M (example 50 Gbit/s×0.1%/1 Gbit/s=0.5). By reporting a flow is meant informing the flow switch that the flow is to be routed via the optimising node.

Embodiments herein also relate to a sampling node in a Software Defined Network, SDN, for handling flows through the SDN between client(s) and origin server(s) of a communication network. The sampling node has the same technical features, objects and advantages as the method performed by the sampling node. The sampling node will thus only be described in brief in order to avoid unnecessary repetition.

Figure 4:
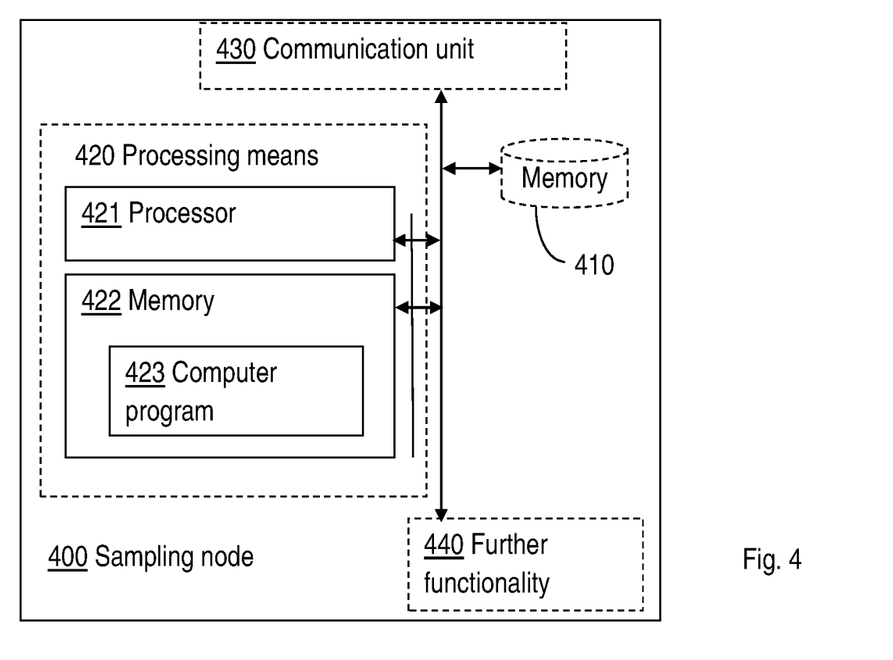
FIG. 4 is a block diagram of a sampling node in a SDN for handling flows through the SDN between client(s) and origin server(s) of a communication network, according to an exemplifying embodiment.
Figure 5:
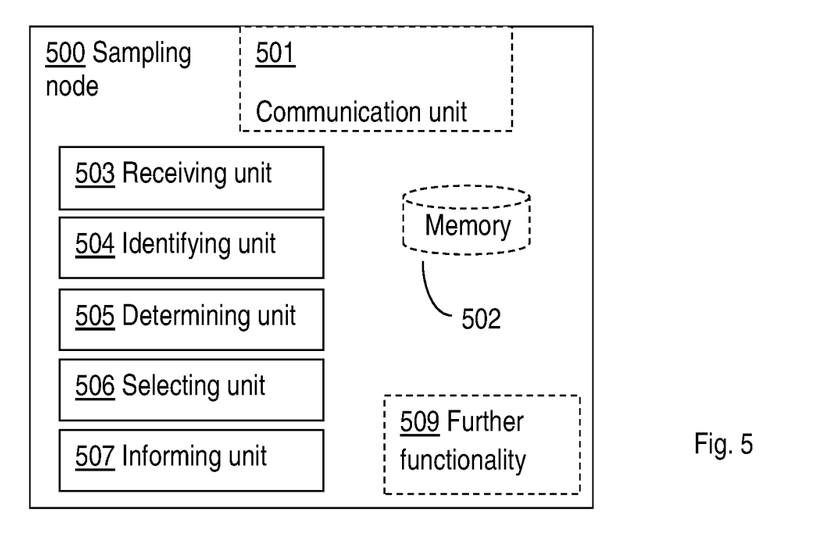
FIG. 5 is a block diagram of a sampling node in a SDN for handling flows through the SDN between client(s) and origin server(s) of a communication network, according to another exemplifying embodiment.

Embodiments of the sampling node in the SDN will be briefly described with reference to FIGS. 4 and 5. FIGS. 4 and 5 illustrate the sampling node in the SDN being configured for receiving a fraction of a total amount of traffic flows originating at client(s) served by the SDN, and destined for the origin server(s); identifying which of the received traffic flows that benefit from being routed via a service optimising node, capable of providing value added services, VAS, to the traffic flows, by fulfilling predetermined conditions; and determining, for each individual traffic flow, a capacity demand of the flow. The sampling node 400, 500 is further configured for selecting which traffic flows that shall be routed via the service optimising node on the basis of their capacity demand; and informing a flow switch of the SDN about which traffic flows should bypass the service optimising node and which traffic flows that should be routed via the service optimising node.

The sampling node 400, 500 may be realised or implemented in different ways. One exemplifying implementation, or realisation, is illustrated in FIG. 4. FIG. 4 illustrates the sampling node 400 comprising a processor 421 and memory 422, the memory comprising instructions, e.g. by means of a computer program 423, which when executed by the processor 421 causes the sampling node 400 to receive a fraction of a total amount of traffic flows originating at client(s) served by the SDN, and destined for the origin server(s); to identify which of the received traffic flows that benefit from being routed via a service optimising node, capable of providing value added services, VAS, to the traffic flows, by fulfilling predetermined conditions; and to determine determining, for each individual traffic flow, a capacity demand of the flow. The memory may further comprise instructions, which when executed by the processor causes the sampling node to select which traffic flows that shall be routed via the service optimising node on the basis of their capacity demand; and to inform a flow switch of the SDN about which traffic flows should bypass the service optimising node and which traffic flows that should be routed via the service optimising node.

FIG. 4 also illustrates the sampling node 400 comprising a memory 410. It shall be pointed out that FIG. 4 is merely an exemplifying illustration and memory 410 may optionally, be a part of the memory 422 or be a further memory of the sampling node 400. The memory may for example comprise information relating to the sampling node 400, to statistics of operation of the sampling node 400, just to give a couple of illustrating examples. FIG. 4 further illustrates the sampling node 400 comprising processing means 420, which comprises the memory 422 and the processor 421. Still further, FIG. 4 illustrates the sampling node 400 comprising a communication unit 430. The communication unit 430 may comprise an interface through which the sampling node 400 communicates with other nodes, servers, wireless devices or entities of the communication network. FIG. 4 also illustrates the sampling node 400 comprising further functionality 440. The further functionality 440 may comprise hardware of software necessary for the sampling node 400 to perform different tasks that are not disclosed herein.

Another implementation, or realisation, is illustrated in FIG. 5. FIG. 5 illustrates the sampling node 500 comprising a receiving unit 503 for receiving a fraction of a total amount of traffic flows originating at client(s) served by the SDN, and destined for the origin server(s). The sampling node 500 further comprises an identifying unit 504 for identifying which of the received traffic flows that benefit from being routed via a service optimising node, capable of providing value added services, VAS, to the traffic flows, by fulfilling predetermined conditions; and a determining unit 505 for determining, for each individual traffic flow, a capacity demand of the flow. Still further, the sampling node 500 comprises a selecting unit 506 for selecting which traffic flows that shall be routed via the service optimising node on the basis of their capacity demand; and an informing unit 507 for informing a flow switch of the SDN about which traffic flows should be routed directly to the origin server(s) and which traffic flows that should be routed via the VAS.

In FIG. 5, the sampling node 500 is also illustrated comprising a communication unit 501. Through this unit, the sampling node 500 is adapted to communicate with other nodes and/or entities in the wireless communication network. The communication unit 501 may comprise more than one receiving arrangement. For example, the communication unit 501 may be connected to both a wire and an antenna, by means of which the sampling node 500 is enabled to communicate with other nodes and/or entities in the wireless communication network. Similarly, the communication unit 501 may comprise more than one transmitting arrangement, which in turn may be connected to both a wire and an antenna, by means of which the sampling node 500 is enabled to communicate with other nodes and/or entities in the wireless communication network. The sampling node 500 further comprises a memory 502 for storing data. Further, the sampling node 500 may comprise a control or processing unit (not shown) which in turn is connected to the different units 503-505. It shall be pointed out that this is merely an illustrative example and the sampling node 500 may comprise more, less or other units or modules which execute the functions of the sampling node 500 in the same manner as the units illustrated in FIG. 5.

It should be noted that FIG. 5 merely illustrates various functional units in the sampling node 500 in a logical sense. The functions in practice may be implemented using any suitable software and hardware means/circuits etc. Thus, the embodiments are generally not limited to the shown structures of the sampling node 500 and the functional units. Hence, the previously described exemplary embodiments may be realised in many ways. For example, one embodiment includes a computer-readable medium having instructions stored thereon that are executable by the control or processing unit for executing the method steps in the sampling node 500. The instructions executable by the computing system and stored on the computer-readable medium perform the method steps of the sampling node 500 as set forth in the claims.

The sampling node may form part of some other known node or be configured as a separate functional entity. The sampling node may alternatively be comprised in a cloud implementation.

The sampling node has the same possible advantages as the method performed by the sampling node. One possible advantage is that possible overload situations in the service optimising node may be avoided. Another possible advantage is that the usage of capacity of the service optimising node may be maximised such that no or little capacity is left unused. Another possible advantage is that little, or no, supervision or monitoring may be required in order to detect a possible overflow situation. Still a possible advantage is that the dimensioning and performance management processes may be simplified.

According to an embodiment, the sampling node is configured for determining the capacity demand of individual flows by determining a respective total capacity demand of the identified individual traffic flows with respect to the total amount of traffic flows from client(s) destined for the origin server(s) based on the capacity demand of the flows within the received fraction and on the assumption that the distribution of individual traffic flows is the same within the total amount of traffic flows as within the received fraction of the total amount of traffic flows.

According to yet an embodiment, the capacity demand of a flow is defined as an amount of data associated with the traffic flow.

According to still an embodiment, the capacity demand of a flow is defined as a data bit rate.

According to another embodiment, a traffic flow is identified based on destination IP-address, protocol and/or destination port.

According to yet an embodiment, the sampling node 400, 500 further is configured for sorting the identified individual traffic flows based on at least one of: the number of times a traffic flow is present within the fraction, the capacity demand of the respective traffic flows, and a priority indication of a traffic flow, wherein selecting which individual traffic flows that shall be routed via the service optimising node further is based on the sorting of the identified individual traffic flows.

According to still an embodiment, the sampling node is configured for selecting which individual traffic flows that shall be routed via the service optimising node by: after selecting a first traffic flow that shall be routed via the service optimising node, determining a remaining capacity of the service optimising node if the first traffic flow does not consume the total capacity of the service optimising node, selecting a further traffic flow to be routed via the service optimising node if the capacity demand of the further traffic flow does not exceed the remaining capacity of the service optimising node, and repeating until there is no remaining capacity of the service optimising node.

Figure 6:
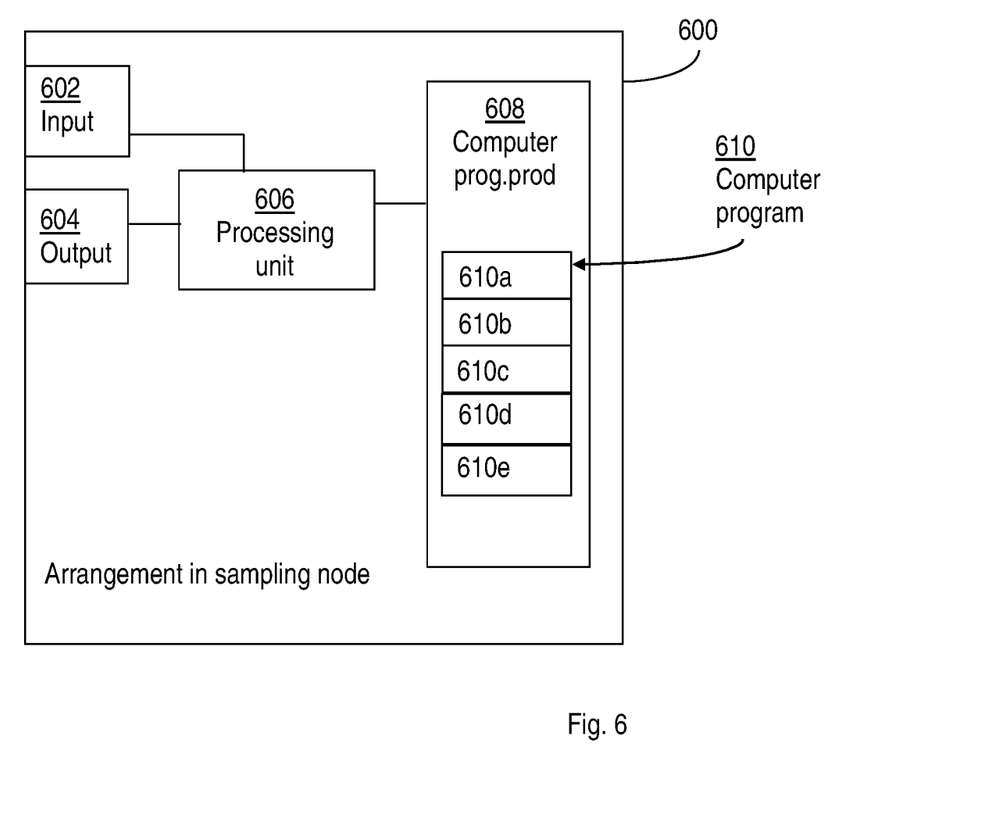
FIG. 6 is a block diagram of an arrangement in a sampling node in a SDN for handling flows through the SDN between client(s) and origin server(s) of a communication network, according to an exemplifying embodiment.

FIG. 6 schematically shows an embodiment of an arrangement 600 in a sampling node 500. Comprised in the arrangement 600 in the sampling node 500 are here a processing unit 606, e.g. with a Digital Signal Processor, DSP. The processing unit 606 may be a single unit or a plurality of units to perform different actions of procedures described herein. The arrangement 600 in the sampling node 500 may also comprise an input unit 602 for receiving signals from other entities, and an output unit 604 for providing signal(s) to other entities. The input unit and the output unit may be arranged as an integrated entity or as illustrated in the example of FIG. 5, as one or more interfaces, or communication units, 501.

Furthermore, the arrangement 600 in the sampling node 500 comprises at least one computer program product 608 in the form of a non-volatile memory, e.g. an Electrically Erasable Programmable Read-Only Memory, EEPROM, a flash memory and a hard drive. The computer program product 608 comprises a computer program 610, which comprises code means, which when executed in the processing unit 606 in the arrangement 600 in the sampling node 500 causes the sampling node 500 to perform the actions e.g. of the procedure described earlier in conjunction with FIGS. 1*a*-1*b*.

The computer program 610 may be configured as a computer program code structured in computer program modules 610*a*-610*e*. Hence, in an exemplifying embodiment, the code means in the computer program of the arrangement 600 in the sampling node 500 comprises an receiving unit, or module, for receiving a fraction of a total amount of traffic flows originating at client(s) served by the SDN, and destined for the origin server(s). The computer program further comprises an identifying unit, or module, for identifying which of the received traffic flows that benefit from being routed via a service optimising node, capable of providing value added services, VAS, to the traffic flows, by fulfilling predetermined conditions; and a determining unit, or module for determining, for each individual identified traffic flows, a capacity demand of the flow. Still further, the computer program comprises selecting unit, or module for selecting which individual traffic flows that shall be routed via the service optimising node on the basis of their capacity demand considering a capacity of the service optimising node; and an informing unit, or module, for informing a flow switch of the SDN about which traffic flows should be routed directly to the origin server(s) and which traffic flows that should be routed via the VAS.

The computer program modules could essentially perform the actions of the flow illustrated in FIG. 1a, to emulate the sampling node 500. In other words, when the different computer program modules are executed in the processing unit 606, they may correspond to the units 503-505 of FIG. 5.

Although the code means in the respective embodiments disclosed above in conjunction with FIG. 5 are implemented as computer program modules which when executed in the respective processing unit causes the sampling node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the sampling node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a sampling node in a Software Defined Network (SDN) for handling traffic flows, the method comprising:

the sampling node identifying from among the traffic flows at least a first traffic flow that may benefit from being routed via a service optimizing node (SON) capable of providing a value added service (VAS) to the first traffic flow, wherein the sampling node is separate from the SON;

the sampling node determining a capacity demand of the first traffic flow;

the sampling node determining a capacity of the SON;

the sampling node performing a comparison based on the capacity demand of the first traffic flow and the capacity of the SON;

based on the comparison, the sampling node determining whether the SON can accommodate the determined capacity demand of the first traffic flow; and the sampling node informing a flow switch of the SDN that the first traffic flow should bypass the SON as a result of determining that the SON cannot accommodate the determined capacity demand of the first traffic flow.

2. The method of claim 1, wherein determining the capacity demand of the first traffic flow comprises determining a total capacity demand of the first traffic flow within a total amount of the traffic flows based on:

a fractional capacity demand of the first traffic flow within a fraction of the total amount of the traffic flows, and the assumption that a distribution of individual traffic flow among the traffic flows is the same within the total amount of traffic flows as within the fraction of the total amount of traffic flows.

3. The method of claim 1, wherein the capacity demand of the first traffic flow is defined as an amount of data associated with the first traffic flow.

4. The method of claim 1, wherein the capacity demand of the first traffic flow is defined as a data bit rate.

5. The method of claim 1, wherein the first traffic flow is identified based on destination IP-address, protocol, and/or destination port.

6. The method of claim 1, further comprising:

sorting traffic flows based on at least one of: the number of times a traffic flow is present within a fraction of a total amount of traffic flows, capacity demand of a traffic flow, or a priority indication of a traffic flow; and selecting a traffic flow that should be sent to the SON based on the sorting of traffic flows.

7. The method of claim 1, further comprising:

identifying a second traffic flow that may benefit from being routed via the SON;

determining a capacity demand of the second traffic flow;

based on the determined capacity demand of the second traffic flow and the determined capacity of the SON, determining whether the SON can accommodate the determined capacity demand of the second traffic flow; and informing the flow switch of the SDN that the second traffic flow should be sent to the SON as a result of determining that the SON can accommodate the determined capacity demand of the second traffic flow.

8. A sampling node in a Software Defined Network (SDN) for handling traffic flows, the sampling node comprising:

a processor; and a memory comprising instructions which, when executed by the processor, cause the processor to:

identify from among the traffic flows at least a first traffic flow that may benefit from being routed via a service optimizing node (SON) that is capable of providing a value added service (VAS) to the first traffic flow;
determine a capacity demand of the identified first traffic flow,
determine a capacity of the SON,
perform a comparison based on the capacity demand of the first traffic flow and the capacity of the SON;
based on the comparison, determine whether the SON can accommodate the determined capacity demand of the first traffic flow; and
inform a flow switch of the SDN that the first traffic flow should bypass the SON as a result of determining that the SON cannot accommodate the determined capacity demand of the first traffic flow, wherein
the sampling node is separate from the SON.

9. The sampling node of claim 8, wherein
the sampling node is configured to determine the capacity demand of the first traffic flow by determining a total capacity demand of the first traffic flow within a total amount of the traffic flows based on:
  a fractional capacity demand of the first traffic flow within a fraction of the total amount of the traffic flows, and
  the assumption that a distribution of individual traffic flow among the traffic flows is the same within the total amount of traffic flows as within the fraction of the total amount of traffic flows.

10. The sampling node of claim 8, wherein the capacity demand of the first traffic flow is defined as an amount of data associated with the first traffic flow.

11. The sampling node of claim 8, wherein the capacity demand of the first traffic flow is defined as a data bit rate.

12. The sampling node of claim 8, wherein the first traffic flow is identified based on destination IP-address, protocol and/or destination port.

13. The sampling node of claim 8, further being configured to:
  sort traffic flows based on at least one of: the number of times a traffic flow is present within a fraction of a total amount of traffic flows, capacity demand of a traffic flow, or a priority indication of a traffic flow; and
  select a traffic flow that should be sent to the SON based on the sorting of traffic flows.

14. The sampling node of claim 8, wherein the sampling node is configured to:
  identify a second traffic flow that may benefit from being routed via the SON,
  determine a capacity demand of the second traffic flow,
  based on the determined capacity demand of the second traffic flow and the determined capacity of the SON, determine whether the SON can accommodate the determined capacity demand of the second traffic flow, and
  inform the flow switch of the SDN that the second traffic flow should be sent to the SON as a result of determining that the SON can accommodate the determined capacity demand of the second traffic flow.

15. A computer program product comprising a non-transitory computer readable medium comprising a computer program comprising computer readable code, which, when run in a processing unit comprised in a sampling node causes the sampling node to perform the method of claim 1.

16. The method of claim 7, further comprising:
identifying a third traffic flow that may benefit from being routed via the SON;
determining a capacity demand of the third traffic flow;
determining a remaining capacity of the SON after the SON accommodates the capacity demand of the second traffic flow;
based on the determined capacity demand of the third traffic flow and the determined remaining capacity of the SON, determining whether the SON can accommodate the determined capacity demand of the third traffic flow; and
informing the flow switch of the SDN that the third traffic flow should bypass the SON as a result of determining that the SON cannot accommodate the determined capacity demand of the third traffic flow.

17. The sampling node of claim 14, wherein the sampling node is configured to:
identify a third traffic flow that may benefit from being routed via the SON;
determine a capacity demand of the third traffic flow;
determine a remaining capacity of the SON after the SON accommodates the capacity demand of the second traffic flow;
based on the determined capacity demand of the third traffic flow and the determined remaining capacity of the SON, determine whether the SON can accommodate the determined capacity demand of the third traffic flow; and
inform the flow switch of the SDN that the third traffic flow should bypass the SON as a result of determining that the SON cannot accommodate the determined capacity demand of the third traffic flow.

18. A method for handling traffic flows, the traffic flows comprising a set of sample flows and a set of regular flows, the method comprising:
identifying from among the set of sample flows a subset of sample flows that are to be routed via a service optimizing node (SON) that is capable of providing a value added service (VAS);
routing the subset of sample flows via the SON;
identifying from among the set of regular flows a subset of regular flows that are to be routed via the SON; and
routing the subset of regular flows via the SON, wherein
a ratio of the set of sample flows to the regular flows is 1/F,
a throughput of the subset of sample flows is R,
a throughput of the subset of regular flows is C,
a throughput of the set of sample flows is M, and $$\frac{R}{M} = \frac{C}{\frac{M}{F}} = \frac{C \times F}{M}.$$

19. The method of claim 1, wherein the capacity demand of the first traffic flow is determined based on a capacity demand of a portion of the first traffic flow and a proportion of the first traffic flow to the traffic flows.

20. The method of claim 1, wherein the VAS is at least one of caching or transcoding.

* * * * *